United States Patent [19]

Wooldridge

[11] 4,050,661

[45] Sept. 27, 1977

[54] ADJUSTABLE MOUNTING

[75] Inventor: John Wooldridge, Sheffield, England

[73] Assignee: James Neill Holdings Limited, Sheffield, England

[21] Appl. No.: 703,020

[22] Filed: July 6, 1976

[30] Foreign Application Priority Data

July 8, 1975 United Kingdom ............... 18708/75

[51] Int. Cl.² .............................................. A47F 5/00
[52] U.S. Cl. .................................. 248/285; 248/296; 33/172 B
[58] Field of Search ............... 248/231, 285, 286, 287, 248/296, 299; 33/170, 172 B

[56] References Cited

U.S. PATENT DOCUMENTS

| 2,207,625 | 7/1940 | Lester | 33/170 |
| 2,702,430 | 2/1955 | Bohnet | 33/172 B |
| 3,106,023 | 10/1963 | Wilson | 33/170 |
| 3,765,098 | 10/1973 | Schafer | 33/172 B |

*Primary Examiner*—Robert A. Hafer
*Attorney, Agent, or Firm*—Lowe, King, Price & Markva

[57] ABSTRACT

An adjustable mounting for a dial gauge is provided with provision for fine adjustment through a rotating sleeve having an inclined end face bearing against the adjacent end of a mounting member on the support stem for the gauge. A bridging piece extending radially outward from the stem engages the inclined face and a spring urges the sleeve against the bridging member. The mounting member is held on the stem by a pivot pin extending transversely through the stem. Additional positioning adjustment is provided by a knuckle assembly with a spring between the support stem and a main support pillar with a single operating locking screw.

10 Claims, 3 Drawing Figures

U.S. Patent  Sept. 27, 1977  4,050,661
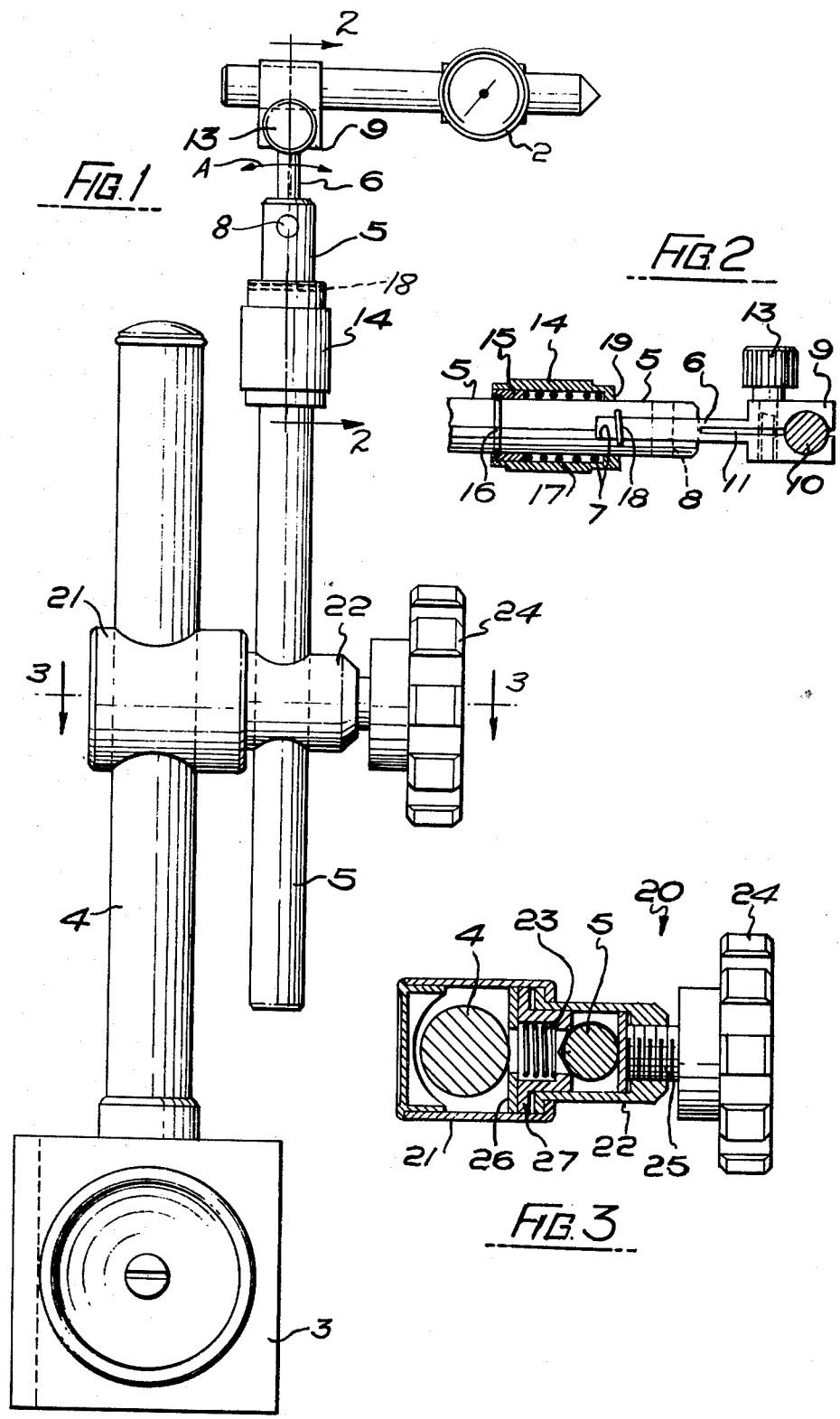

ADJUSTABLE MOUNTING

This invention relates to adjustable mountings and is particularly, but not exclusively, concerned with adjustable mountings for gauges and the like.

In many applications, of which machine tools are a good example, various components need to be located in position with great accuracy. It is, therefore already known to utilise measuring gauges, such as dial gauges, to test the position of the component concerned. In such applications as machine tools, the complexity of the machine frequently makes accurate positioning of a gauge or the like difficult in itself. This led to the development of units allowing universal movement of the gauge or the like, so that with the unit secured to any convenient point in the machine, such as by the use of a magnetic base, the gauge or the like can be brought to its desired location. Thus, units are known to comprise a magnetic base, a main mounting pillar extending from the base a stem mounted with provision for axial, lateral and angular adjustment with respect of the pillar and a gauge or the like mounted on the stem again with provision for axial, lateral and angular adjustment with respect of the stem. Such units allow the gauge or the like to be brought with relative ease into close proximity to its final position, but unless some means of fine adjustment of the gauge or the like is provided, final and exact positioning of the gauge or the like is extremely difficult.

According to the present invention, an adjustable mounting comprises a stem, a mounting member pivotally secured to one end of the stem, a sleeve rotatably mounted on the stem such that an inclined end face on the sleeve or the mounting member bears against the adjacent end of the mounting member or the sleeve to each side of the centre and spring means to urge the sleeve against the end of the mounting member.

Preferably, the end of the stem is slotted, and the mounting member is pivotally secured in the slot. Whilst the inclined end face of the sleeve or the mounting member may bear directly on the end of the mounting member, or the sleeve, it is preferred to provide a bridging piece between the end of the sleeve and the end of the mounting member, which when the end of the stem is slotted, lies within the slot.

To provide the spring means urging the sleeve against the end of the mounting member, a groove may be provided on the stem to be fitted by a circlip holding a collar to the stem, a coil spring surrounding the stem being fitted between the collar and the inner face of the end of the sleeve towards the mounting member.

Thus, with the mounting member set in-line with the stem, rotation of the sleeve causes the inclined end face to lift one side of the mounting member and thereby cause its angular adjustment about its pivotal connection to the stem.

Thus, with the stem suitably mounted in, e.g. a machine, devices such as gauges can be secured to the mounting member by suitable clamp means at its end. With the stem located with reasonable accuracy, the, e.g. gauge can then be precisely located by rotating the sleeve to effect fine angular adjustment of the mounting member and hence the gauge.

To provide a still further range of adjustments, the mounting member may be pivotally secured to the stem such that it can be rotated through 90° in both directions from an in-line position with respect to the stem, when the respective side face of the mounting member bears against the end face of the sleeve, again directly or through the intermediary of a bridging piece, and when again the end of the sleeve or the respective side face is inclined to allow angular adjustment by rotation of the sleeve.

In order that the stem can be positioned with reasonable accuracy, it may be secured with provision for lengthwise lateral and angular adjustment in a knuckle, which knuckle may be mounted for lengthwise adjustment on a pillar adapted to be secured, e.g. in a machine. To facilitate the securing of the pillar in the machine, it may be mounted on a so-called magnetic base, capable of being switched "ON" and "OFF" so that it can be mounted in and removed from the machine at will.

One embodiment of the invention will now be described with reference to the accompanying drawings, in which:

FIG. 1 is a side elevation of a unit incorporating an adjustable mounting of the invention;

FIG. 2 is a part sectional side elevation of the adjustable mounting of FIG. 1 on the line 2—2 with the gauge removed; and FIG. 3 is a section on the line 3—3 of FIG. 1, to a larger scale.

In the drawings, a unit 1 for mounting a dial gauge 2 in, for example, a machine tool, not shown, has a magnetic base 3 including means to short circuit the external field of the magnets (not shown) there in (i.e., means to allow the magnetic base to be switched "ON" or "OFF") from which extends a mounting pillar 4 supporting a stem 5. At the end of the stem 5 there is provided a mounting member 6 to which is secured the gauge 2.

As is shown more particularly by FIG. 2, a slot 7 is provided in the end of the stem 5 in which the mounting member 6 is secured on a pivot pin 8. At the end of the mounting member is provided a head 9 having a mounting hole 10 and a slot 11 allowing the two halves of the head to be closed on to the mounting stem 12 of the gauge by a screw 13. A sleeve 14 is rotatably mounted on the stem 5, between the end of the mounting member 6 and a collar 15 located on the stem by a circlip 16 or lock ring, there being a spring 17 acting between the collar and the end of the sleeve to urge the sleeve into contact with the mounting member 6, preferably, as shown, through a bearing member or bridging piece 18. The bearing member 18 is carried in engagement with the end of the mounting member 6 and extends radially outward on both sides of the center axis of stem 5 forming a bridging piece 18, that is, spanning to opposite sides of the upper inclined face 19 (see FIG. 1). The end face 19 of the sleeve in contact with the mounting member lies at an acute angle to the plane at right angles to the longitudinal axis of the stem 5. Since the slot 7 is open below the bearing member, the stem 6 is free to pivot about pivot 8 without interference with the inner annular face of the shoulder at the top of sleeve 14. By manual movement of the stem 6 right or left about horizontal pivot pin 8 by a full 90° (note direction of arrow A), the stem 6 can be brought from the in-line position with respect to the stem to a new rough adjusted position. In these positions, the side of mounting member 6 rather than the end rests on the bridging piece 18. During this movement, one edge of the lower end of the mounting member eventually slides over center thereby snapping the mounting member into its new 90° adjusted position.

The fine adjustment pivoting motion of the mounting member is also illustrated by viewing motion arrow A in FIG. 1. Thus, viewing FIG. 1, the home position may be with mounting member either aligned along the center axis of the stem 5, or at 90° thereto. Rotation of the sleeve 14 about its vertical axis through 90° (from the home position as shown) to the left (clockwise) in FIG. 1, pivots the stem 6 to the right for a fine adjustment; whereas, similar rotation to the right pivots the stem to the left for fine adjustment in that direction. The stem 5 is mounted on the pillar 4 by a knuckle joint 20 (FIG. 3). The knuckle assembly 20 has a knuckle body 21 through which the pillar 4 passes, and an extension 22 to the knuckle body rotatable thereon through which the stem passes, there being compression spring means 23 situated within the knuckle body between the stem and the pillar and an operating handle 24 with a locking member 25 passing into the extension to the knuckle body. Thus, with the operating handle 24 unscrewed, the knuckle body 21 can be positioned along the length of the pillar 4, and the stem 5 adjusted in lengthwise manner on the extension 22 to the body. The extension 22 may also be rotated to adjust angularly the stem and the stem can be rotated about its own axis. The operating handle 24 is then screwed in to urge the stem 5 against the spring 23 which thus urges the pillar 4 against the knuckle housing 21 to lock the knuckle housing 21 to the pillar 4 and the stem 5 to the knuckle housing 21.

To keep the compression spring in place, a pressure plate 26 is provided between the pillar 4 and the spring 23, the spring lying in a housing 27 against which the stem bears.

Thus, with the magnetic base 3 placed on any convenient ferro-magnetic component of, e.g. a machine tool, and switched on, the unit 1 is firmly held in place. By loosening the operating handle 24, the gauge 2 can rapidly be brought into very close proximity to its required position and locked in that position by tightening the operating handle. Then, by simply rotating the sleeve 14, the mounting member 6 is caused to pivot about the pivot 8, thereby allowing extremely fine and positive adjustment of the position of the gauge 2 to bring it to its required position.

What I claim is:

1. An adjustable mounting comprising a stem, a mounting member pivotally secured to one end of the stem, a sleeve rotatably mounted on the stem, an inclined end face on the sleeve bearing against the adjacent end of the mounting member on each side of the center axis of the stem and spring means to urge the sleeve against the adjacent end of the mounting member.

2. An adjustable mounting as in claim 1, wherein the end of the stem is slotted, and the mounting member is pivotally secured in the slot.

3. An adjustable mounting as in claim 1, wherein a bridging piece is provided between the end of the sleeve and the end of the mounting member.

4. An adjustable mounting as in claim 1, wherein to provide the spring means urging the sleeve against the end of the mounting member, a groove is provided on the stem, a lock ring fitting in said groove, a collar held on the stem by said ring, a coil spring surrounding the stem being fitted between the collar and the inner face of the end of the sleeve towards the mounting member.

5. An adjustable mounting as in claim 1, wherein to provide a still further range of adjustments the mounting member is free to be pivotally rotated through 90° in both directions from an in-line position with respect to the stem, the respective side face of the mounting member bearing against the end face of the sleeve to provide new rough adjusted positions.

6. An adjustable mounting as in claim 1, wherein is provided a mounting pillar, a knuckle assembly on said pillar, and adjusting means with provision for lengthwise, lateral, angular and rotational adjustment in said knuckle assembly.

7. An adjustable mounting as in claim 6, wherein the knuckle comprises a knuckle assembly body through which the pillar passes, and an extension to the knuckle body rotatable thereon through which the stem passes, there being compression spring means situated within the knuckle body between the stem and the pillar, and an operating handle with a locking screw passing into the extension to the knuckle body.

8. An adjustable mounting as in claim 7, wherein a pressure plate is provided between the pillar and the spring means, a housing against which the stem bears for confining said spring means.

9. An adjustable mounting as in claim 1, wherein magnetic means are provided to locate the mounting in close proxmity to its required position.

10. An adjustable mounting as in claim 8, wherein the magnetic means are secured to the mounting pillar.

* * * * *